United States Patent [19]

Parkin

[11] 4,073,005

[45] Feb. 7, 1978

[54] MULTI-PROCESSOR COMPUTER SYSTEM

[75] Inventor: Thomas Randall Parkin, Edina, Minn.

[73] Assignee: Control Data Corporation, Minneapolis, Minn.

[21] Appl. No.: 435,356

[22] Filed: Jan. 21, 1974

[51] Int. Cl.² ............................ G06F 9/18; G06F 9/16; G06F 13/08
[52] U.S. Cl. .................................................. 364/200
[58] Field of Search ............... 340/172.5; 364/200, 364/300, 900

[56] References Cited

U.S. PATENT DOCUMENTS

| | | | |
|---|---|---|---|
| 3,348,210 | 10/1967 | Ochsner | 340/172.5 |
| 3,349,375 | 10/1967 | Seeber et al. | 340/172.5 |
| 3,350,689 | 11/1967 | Underhill et al. | 340/172.5 |
| 3,421,150 | 1/1969 | Quosig et al. | 340/172.5 |
| 3,480,914 | 11/1969 | Schlaeppi | 340/172.5 |
| 3,551,892 | 12/1970 | Driscoll | 340/172.5 |
| 3,560,934 | 2/1971 | Ernst et al. | 364/200 |
| 3,566,363 | 2/1971 | Driscoll | 340/172.5 |
| 3,618,040 | 11/1971 | Iwamoto et al. | 340/172.5 |
| 3,618,045 | 11/1971 | Campbell et al. | 340/172.5 |
| 3,631,405 | 12/1971 | Hoff et al. | 340/172.5 |
| 3,648,253 | 3/1972 | Mullery et al. | 364/200 |
| 3,665,421 | 5/1972 | Rehhausser et al. | 364/200 |
| 3,683,418 | 8/1972 | Martin | 340/172.5 |
| 3,716,838 | 2/1973 | Beard | 340/172.5 |
| 3,723,976 | 3/1973 | Alvarez et al. | 364/200 |
| 3,735,360 | 5/1973 | Anderson et al. | 340/172.5 |
| 3,753,234 | 8/1973 | Gilbert et al. | 364/200 |
| 3,760,365 | 9/1973 | Kurtzberg et al. | 340/172.5 |
| 3,771,137 | 11/1973 | Barner et al. | 340/172.5 |
| 3,833,889 | 9/1974 | Gray | 364/200 |
| 3,967,247 | 6/1976 | Anderson et al. | 364/200 |

*Primary Examiner*—Gareth D. Shaw
*Assistant Examiner*—Jan E. Rhoads
*Attorney, Agent, or Firm*—Edward L. Schwarz

[57] ABSTRACT

Two or more processors share a large main memory in which are stored the programs and data sets on which the processors operate. Each processor operates independently from every other one, and selects its tasks for operation on the basis of information contained in tables which may be updated independently by each processor.

9 Claims, 7 Drawing Figures

FIG. 2b

FUNCTION WORDS

INTERLOCK REGISTER OPERATIONS

WORD 2

| BIT | 11 | 10 | 9 | 8 | 7 | 6 | 5 | 4 | 3 | 2 | 1 | 0 |
|---|---|---|---|---|---|---|---|---|---|---|---|---|
| CONTAINS | 1 | 0 | 0 | 0 | 0 | 0 | 0 | 0 | 0 | CODE | | |

223a, 223b, 223c

WORD 3

| BIT | 11 | 10 | 9 | 8 | 7 | 6 | 5 | 4 | 3 | 2 | 1 | 0 |
|---|---|---|---|---|---|---|---|---|---|---|---|---|
| CONTAINS | 0 | 0 | I/L REG. BIT ADR. | | | | | | | 0 | 0 | 0 |

224, 224a, 224b, 224c

STATUS WORD

| BIT | 11 | 10 | 9 | 8 | 7 | 6 | 5 | 4 | 3 | 2 | 1 | 0 |
|---|---|---|---|---|---|---|---|---|---|---|---|---|
| CONTAINS | NOT USED | | | | | | | | | | PARITY | ABORT/ACCEPT |

225, 225a, 225b, 225c

DATA TRANSFERS

WORD 1

| BIT | 11 | 10 | 9 | 8 | 7 | 6 | 5 | 4 | 3 | 2 | 1 | 0 |
|---|---|---|---|---|---|---|---|---|---|---|---|---|
| CONTAINS | NOT USED | | LINE COUNT - 1 | | | | | | FUNCTION | | NOT USED | |

220, 220a, 220b, 220c, 220d

WORD 2

| BIT | 11 | 10 | 9 | 8 | 7 | 6 | 5 | 4 | 3 | 2 | 1 | 0 |
|---|---|---|---|---|---|---|---|---|---|---|---|---|
| CONTAINS | 0 | 0 | 0 | ECS ADDRESS BITS 23 - 12 | | | | | | | | |

221, 221a, 221b

WORD 3

| BIT | 11 | 10 | 9 | 8 | 7 | 6 | 5 | 4 | 3 | 2 | 1 | 0 |
|---|---|---|---|---|---|---|---|---|---|---|---|---|
| CONTAINS | ECS ADDRESS BITS 11 - 0 | | | | | | | | | | | |

222, 222b

MULTI-PROCESSOR COMPUTER SYSTEM

BACKGROUND OF THE INVENTION

The field of the invention relates to computers and data processing. Specifically, this invention relates to multiprocessing where a plurality of processors share a common memory and whose operations are in some manner interrelated.

The description of the prior art includes several patents which employ multiple processing units. The most pertinent invention in the prior art of which we are aware is described by U.S. Pat. No. 3,348,210, Ochsner. Ochsner described a computing system in which each processing unit executes programs from a common non-program-alterable memory. This is also true for its task assignment program. Because of this memory sharing, instruction reference by a processor excludes any referency by another until the reference is completed. Hence, it is difficult to match computer memory speed to processor speed economically. Deviation from the optimum number of processors will either cause memory references to backlog, or allow the memory to operate at less than maximum speed. Therefore, no great flexibility in system configuration is permitted.

Another invention employing multiple processing units is that described in U.S. Pat. No. 3,349,375, Seeber et al. In this invention, the memory is split into several modules, each available to any processor desiring to receive data from or execute instructions from a selected one. The Seeber invention is somewhat analogous to the Ochsner invention, but includes the additional flexibility of several memories, any one of which may be available to a processing unit on demand. A third patent, U.S. Pat. No. 3,350,689, Underhill et al, discloses essentially autonomous computers linked together in a synchronized fashion so as to permit data transfers between any pair of the several computers involved.

This entire field is discussed in great detail in *Parallelism in Hardware and Software: Real and Apparent Concurrency*, by Harold Lorin, cpyrt. 1972 Prentice-Hall.

SUMMARY OF THE INVENTION

A very large number of data processing operations are characterized by the necessity of performing a plurality of small to medium scale computing jobs or tasks. Often, these tasks may require very large amounts of rapidly retrievable data but relatively small amounts of processing and computation. At other times, these computing tasks are interrelated in a pattern which is normally unpredictable. If a large number of these tasks is involved, computation may be delayed, whether a single large scale or small scale processor is involved, while the needed programs are being retrieved for execution. For such kinds of operations, cost can be significantly reduced by structuring the computing devices according to the architectural plan forming part of this invention. Execution of each task occurs in one (or conceivably more) of a plurality of processors. Each of these processors is essentially a self-contained computer having an arithmetic section, a control section, an instruction index or counter, and a local memory in which each task under execution and the data associated therewith are stored. There is no need for these processors to be identical. Indeed, it may frequently be advantageous to include in a particular installation processors which differ markedly from one another in speed, instruction repertoire, peripheral units attached, and local memory size. Normally, however, a large percentage of the tasks which the system processes are executable by any one of several of the processors.

The processors all communicate with a main memory into which data and program instructions, i.e., tasks, may be loaded from the local memory of each processor, and from which data may be received by each local memory. These data transfers involving a particular local memory are under sole control of the processor involved.

Tasks and their associated data are entered into the system and the processing results are made available to the user through one or more of the processors controlling and communicating with peripheral devices. Overall management of system input and output is controlled by programs which preferably may be handled like any other task and are performed by the processors involved. A task list contained within the main memory, or in a separate rapid access memory available to every processor, identifies tasks to be executed, task status, and other parameters of task interdependence.

Control of each processor is performed by an Executive program (Exec) stored at least partially in the memory of each. When a processor finishes the current task, or halts execution of it for any reason, control is transferred to its Exec which searches the task list for an unfinished task which it is capable of performing. In general, several criteria must be examined and satisfied before a task may be performed by the processing unit. First, it must be determined that the processing unit is capable of performing the task. E.g., if the task requires floating point mathematical capabilities, and the processor can do only fixed-point arithmetic, that task will not be selected by the processor. If a particular task provides output to a particular peripheral device not accessible by the processor, then the task will be rejected for that reason. When an executable task is encountered, the idle processor causes the instructions and data sets necessary for execution to be transferred to its local memory. Instruction execution commences at the routine's entry point, which may be specified by the task list or may be a standard address. To prevent conflicts caused by two or more processing units selecting one task for execution, there is provided within the task list a flag for each task which is set by the first accessing processor indicating that the task is in execution. To further prevent conflicts, an interlock flip-flop is provided which permits only one processor at a time to change data within the task list. Upon completion of the task list examination by a given processing unit, the lock-out flip-flop is cleared to permit access to the task list by any processor whose Exec program so demands.

It is possible to maintain a priority for each task in the task list. In this way, the processor can resolve the selection conflict when several tasks are otherwise equally suitable for immediate execution.

Accordingly, one object of this invention is to allow the simultaneous execution of several computing tasks.

A second object is to provide a means for buffering data communications between processors.

Another object is to automatically assign each of a plurality of computing tasks to one of a plurality of processors which has the required capabilities, or which can most efficiently perform the task.

BRIEF DESCRIPTION OF THE DRAWINGS

FIG. 2b is a control register function bit chart.

DESCRIPTION OF THE PREFERRED EMBODIMENTS

Figure 1:
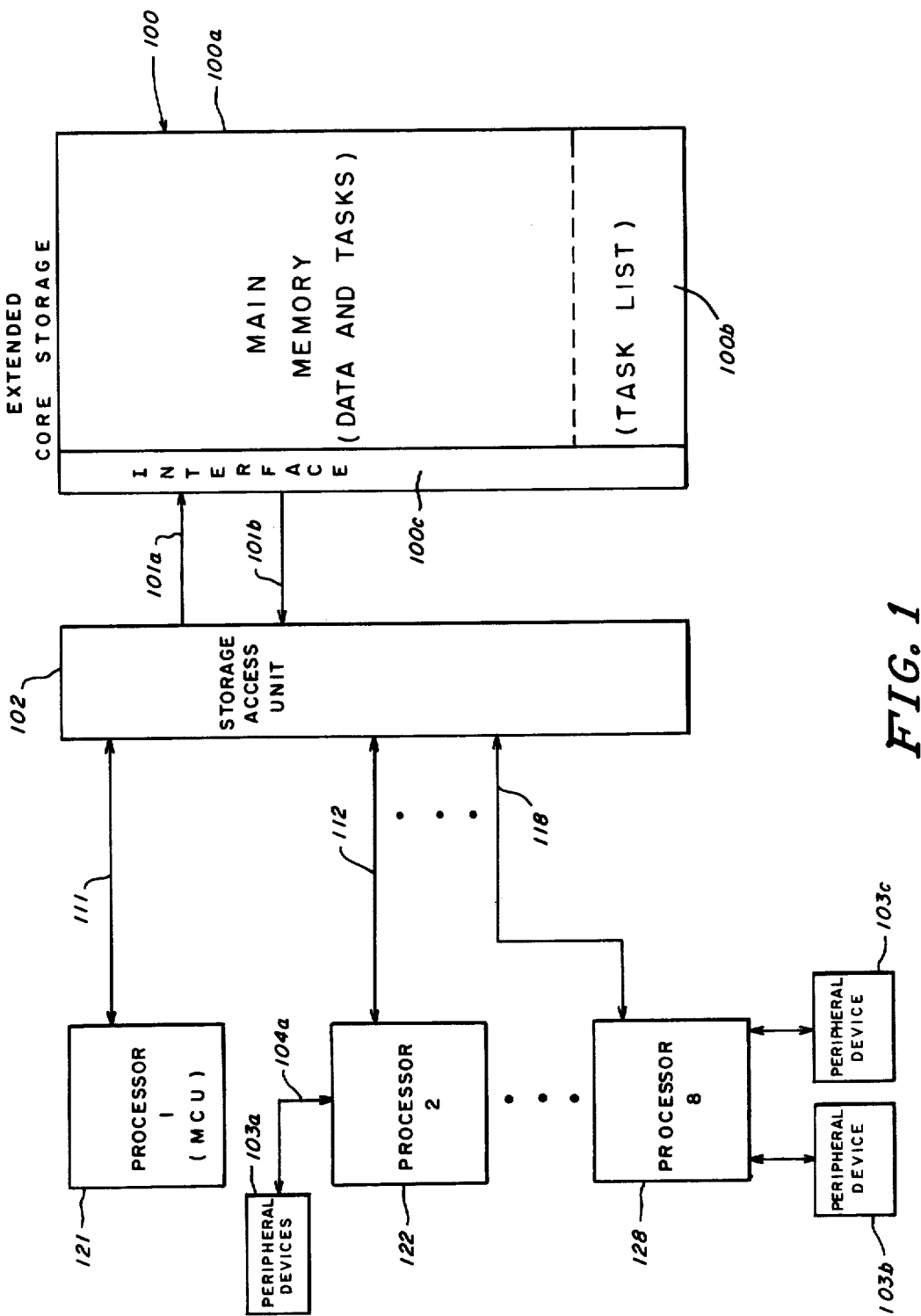
FIG. 1 is a block diagram of the system.

Referring first to FIG. 1, therein is shown the main elements of the computing system in block diagram form. Interconnecting lines denote major data flow paths. In the system shown, computations are performed by eight distinct processors 121–128. Processor 121 is a special-purpose computer used for maintenance and overall system operation and hence may be referred to also as the maintenance control unit (MCU). Processors 2 through 8, 122–128, perform the production computation and normal overhead operations such as processor assignment and input-output operations. Each processor is a digital computer, usually small scale, having both memory and program execution facilities. Data is inserted into and extracted from the system through peripheral devices 103a, 103b, 103c and such others as may be desirable for the expected mix of computing jobs. Typical peripheral devices include card readers and punches, typewriters, magnetic tapes, magnetic discs, and cathode ray tube or other types of display units. Additionally certain peripheral devices which function as external storage units may be chosen. Typical are magnetic discs and magnetic drums. Each peripheral device is connected to one or more processors by a standardized multi-bit data path which has the capability pf transmitting many bits simultaneously.

Each processor 121–128 is connected to storage access unit 102 by two-way data paths, generally designated as channels 111–118. Storage access unit (SAU) 102 provides buffering of the data transfers between processors 121–128 and an extended core storage (ECS) 100. SAU 102 communicates with ECS interface 100c via lines 100a and 100b. In general, since ECS 100 supplies data for a plurality of processors, 121–128, it is necessary that it have significantly greater transfer speed than any individual processor. This is accomplished in our preferred embodiment, by designing ECS 100 to transfer data in 480 bit words at approximately 3.2 microsecond intervals. On the other hand, each processor 121–128 transfers data on channels 111–118 in 12 bit bytes every 0.3 microsecond. SAU 102 contains buffer registers which assemble and disassemble the 480 bit ECS words from and into the 12 bit processor bytes.

A portion of ECS 100 comprises its main memory 100a. A section of main memory 100a is reserved for task list 100b, and this area will be generally referred to as physically comprising the task list, although the task list itself is merely data tables controlling allocation of computational demands.

The task list will be described in greater detail later. Suffice it to say for the present that a task comprises the smallest discrete data processing program which may be performed by any of the processors 121–128. Each task has a task list entry associated therewith containing information which controls the assignment of a particular task to one of the processors 121–128.

Turning now to FIG. 2, therein is shown a processor in large scale block diagram form. Each processor comprises a local memory 200 which in turn comprises an operating storage area 200b, a resident and Exec storage area 200a, and an entrance address 200c. Data transfers to and from these three areas are through data interface 200d. Overall control of processor operation is maintained by control unit 203 which communicates with local memory 200 via input data line 214a and output data line 214b. It should be understood that control unit 203 supplies the various control signals implicit in the description of operation to all of the various elements of the processor. (Unless otherwise noted, the flow lines denote data flow.) Arithmetic unit 206 performs the necessary arithmetic calculations under control of control unit 203, on operands received on input data line 207b. Results of computation are returned to control unit 203 via output line 207a. Instruction counter 205 is a register containing the address of each instruction and is updated under control of control unit 203. Normally, the contents of instruction counter 205 increases by one upon the execution of each instruction. When a jump (branch) instruction is executed, a new address is sent from control unit 203 via data path 213 to reset instruction counter 205 to the address of the new instruction. Address register 204 contains the address of each memory reference to memory 200 by control unit 203. This address is continuously available to data interface 200d on line 218. If the word to be read from memory 200 will be used as an instruction, then control unit 203 causes the address received by address register 204 to be transmitted from instruction counter 205 over address line 215. If the word to be transferred to or from memory 200 is not an instruction but is data or an instruction operand, then control unit 203 supplies its address to address register 204 via address line 209.

Memory 200 also communicates with SAU 102 and with optional peripheral device 103a. For convenience, communication between memory 200 and SAU 102 is preferably via a dedicated I/O channel 201a on output data link 216a and input data link 216b. In our embodiment, data links 216a and 216b each comprise 12 individual bit lines permitting parallel transmission of 12 bits to and from SAU 102. Data link 216a supplies data transfer control signals to SAU 102 by a process inferentially specifying certain data transfers as in fact control signals. After the channel has been master cleared by execution of the proper instruction, or after a processor master clear, SAU 102 accepts the first three 12 bit words transmitted on data link 216a as data transfer control signals. Thereafter, the three words following each successfully completed data transfer are assumed to be a data transfer control signal. The format of the three control words is shown in FIG. 2b and will be described in conjunction with the detailed description of SAU 102 below. Upon completion of the data transfer between ECS 100 and the processors, data links 216a and 216b return to their cleared or ready state and become available for another such data transfer. Lines generally indicated as 216 perform similar functions for the other processors.

Peripheral device I/O channels 201b provide the necessary buffering, level changes, and other interface operations between data interface 200d and the optional peripheral devices 103a, shown as a single block. Peripheral I/O channels 201b transfer data between themselves and data interface 200d on output data link 210a and input data link 210b. Peripheral I/O channels 201b communicate with peripheral devices 103a on a plurality of output data links 211b and input data links 211a, only one of each being shown. A set of one output and one input data link is provided for each individual I/O channel. For processors 121-128, a total of eight I/O channels are provided for each in the actual embodiment. One is dedicated to communication with SAU 102 and the remaining seven are available for use with peripheral devices 103a. This arrangement therefore provides a very large number of I/O references generated by a large number of peripheral devices 103a.

Arithmetic unit 206 and control unit 203 may be considered to be conventional in every sense of the word. A wide variety of options and alternatives are present in relation to, for example, instruction repertoire, particular logical data manipulations, floating point arithmetic, and in general any of the diverse approaches to computer design which has characterized the science from its very beginning.

For maintenance processor (MCU) 121, control unit 203 has a function not present in the remaining processors. Under certain conditions, it may occur that a processor 122-128 will "hang", becoming unable to continue computation in the proper fashion. Most often this occurs because of faulty programming. More rarely, it may occur because of an intermittent or an isolated electronic failure. In such situations, MCU 203 will issue a restart signal 208 to the appropriate processor 122-128. Restart signal 208 is accepted by instruction counter 205 of the processor involved causing a predetermined memory 200 address to become the next instruction to be executed. Execution of this instruction initiates a preloaded recovery routine which can gracefully resolve the problem by providing a suitable error indication on the eventual output of the program currently in execution or by performing a maintenance program to determine any persistant electronic error. The recovery program may be part of resident area 200a, or may be loaded into operating area 200b under control of resident area 200a.

Figure 2A:
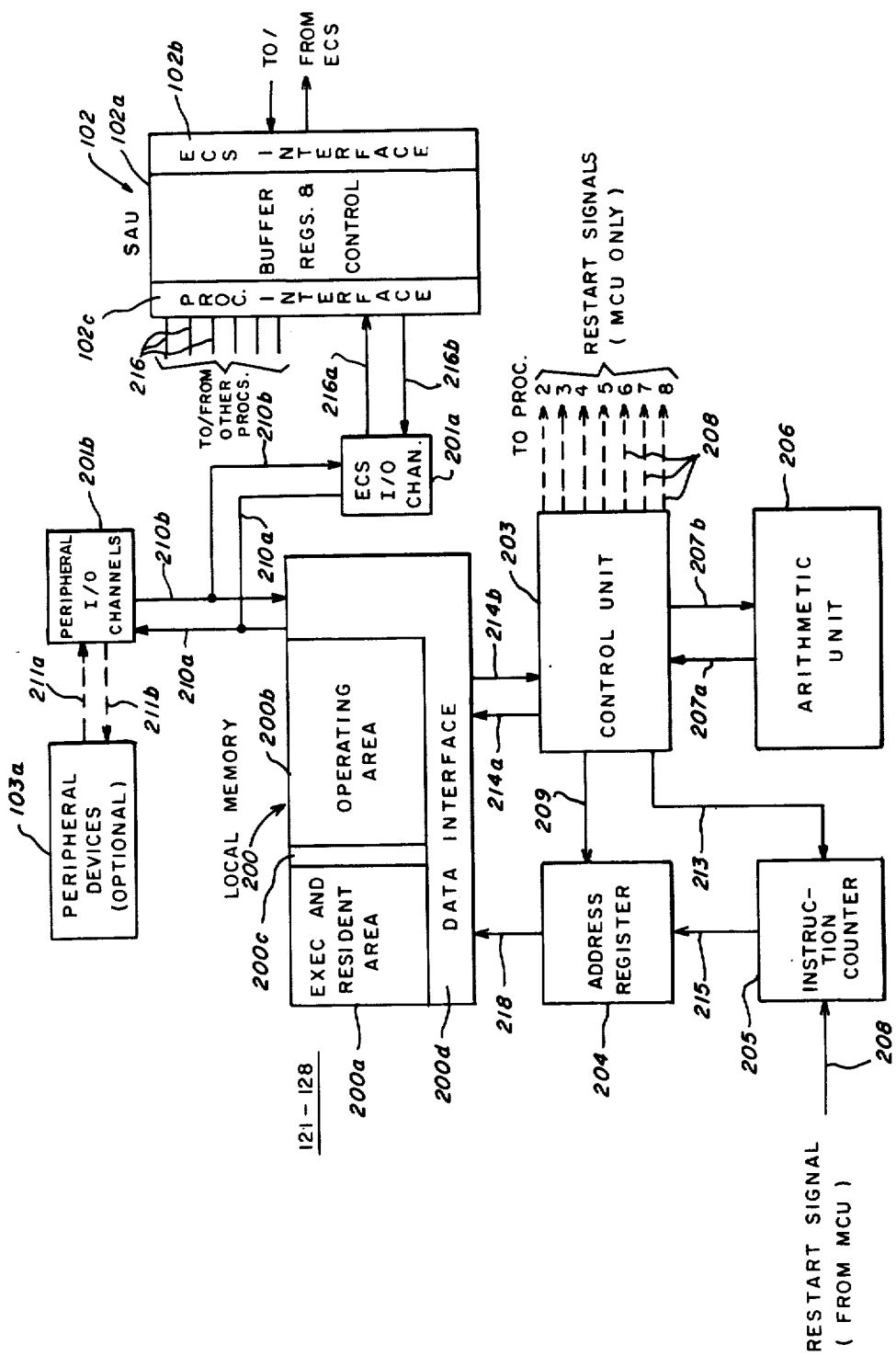
FIG. 2a is a block diagram of an individual processor.

Turning next to SAU 102 shown in FIG. 2a, therein are shown the major subsystems of the SAU 102. Processor interface 102d performs the normal interface operations required, including multiplexing between the various input and output lines from processors 121-128, level changing, and fanning out the data input to buffer registers and associated control 102a. ECS interface 102b transfers the data between the buffers and ECS 100. SAU 102 can be more easily understood by reference to FIGS. 3a and 3b.

Figure 3A:
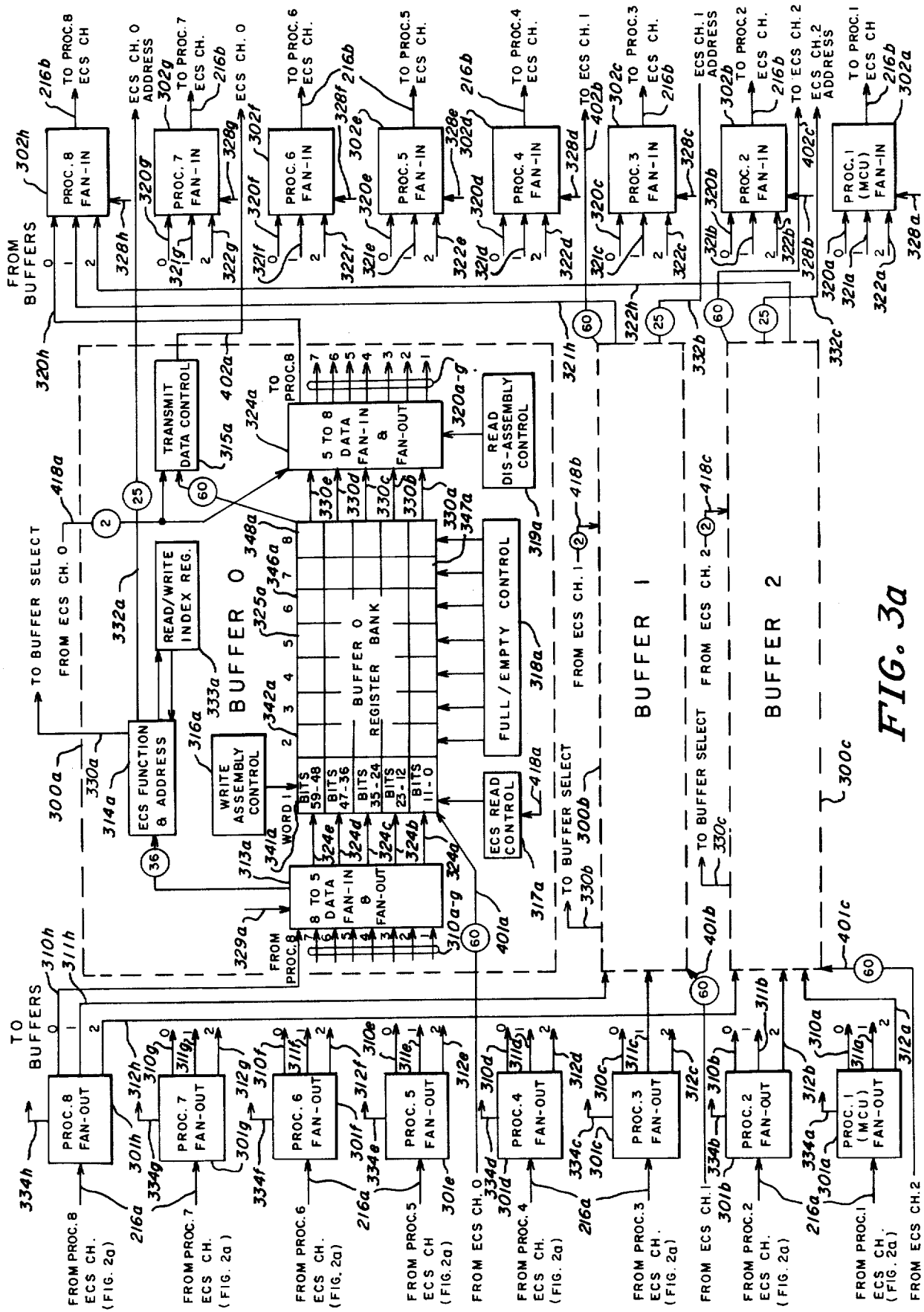
FIGS. 3a and 3b are detailed block diagrams of the storage access unit.
Figure 3B:
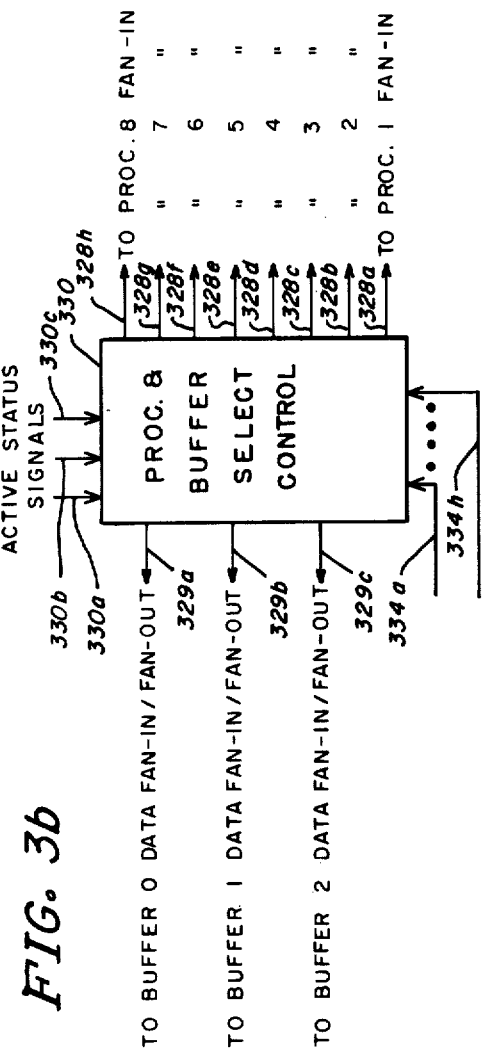

Referring first to FIG. 3a, the dedicated processor I/O channel 201a transmits data to SAU 102 input gates referred to as processor 1-8 fanouts 301a-h on data link 216a. The first three words transmitted from any one of the processor ECS I/O channels 201a to the respective processor fan-out 301a-h, after completion of a previous SAU 102 function involving that processor, or after a processor master clear, are considered to be a data transfer control or other command signal. Considering first data transfer operations, the format of the three control words is illustrated in FIG. 2b by words 1-3, 220-222. Function field 220b, bit 9 of word 1, 220, indicates data transfer from a processor 1-8, 121-128 to ECS 100, i.e., recording, if set to 1. If set to 0, it indicates the retrieval of data recorded in ECS 100. Line count -1 field 220c, bits 8 through 3 of word 1, 220, specify the number of 480 bits ECS 100 lines (40 processor words) to be transmitted, in terms of one less than the actual number of lines to be sent. Thus, to send one line, line count -1 field 220c must be 0. Word 2, 221 and word 3, 222 contain the starting address within ECS 100 which is involved in the record or retrieve operation. Each ECS 100 address word is 24 bits long. Bits 8 through 0 of word 2, 221 comprise the upper 9 bits, and all of word 3, 222, plus 3 low-order binary zeros comprise the lower 15 bits. Field 221a must be 0.

In explaining record and retrieve operations involving ECS 100, buffer 0, 300a, of SAU 102 will be used in the example of typical operation. Buffers 1 and 2, 300b and 300c are identical to buffer 0, so explanations involving buffer 0 apply equally to buffers 1 and 2.

In the record operation, (i.e. transmission of data from a processor 1-8, 121-128 to ECS 100) the three 12 bit data transfer control words are sequentially presented from one of the processor ECS I/O channels 201a, say that of processor 8, 128, to its associated fan-out 301h on output data link 216a. Along with each 12 bits, a word signal is supplied to fan-out 301h which signals the presence of the word on link 216a. Fan-out 301h places the word on its own output lines 310h, 311h, and 312h, where it is received by 8 to 5 data fan-in/out 313a and corresponding to 8 to 5 data fan-in/out assemblies in buffers 1, 300b, and buffer 2, 300c. Processor and buffer select control 330 (FIG. 3b) enables 8 to 5 data fan-in/out 313a (since we assume buffer 0, 300a is idle) to accept the words on line 310h responsive to the request on line 334a. These first three words are transmitted to ECS function and address control 314a. The contents of line count -1 field 220c is sent to read/write index register 333a.

Processor and buffer select control 330 keeps track of whether individual buffers 300a-c are busy or idle by receiving active signals 330a-c, respectively, from them, and enables the 8 to 5 fan-in/out assembly of an idle buffer 300a-c when an input active signal 334a-h is received by it. Input active signals 334a-h are generated by the first word signal received by an idle processor fan-out 301a-h. Although not important during data recording, it is important to note that the origin of input active signals 334a-h is determinable by processor fan-out 301a-h and thus identifies the processor 121-128 involved.

Up to this point, the operation for both recording data in and retrieving data from ECS 100 is identical. Now if recording is specified by function field 220b, the 3 data transfer control words are followed by a multiple of 40 processor words supplied to fan-out 301h by processor 128. This may be under program control, or done by hardware. 8 to 5 fan-in/out 313a accepts each 12 bit word from fan-out 301h, which is receiving the data from processor 128, and places these 12 bits on its output lines 324 a-e for acceptance by buffer 0 register bank 325a. Buffer 0 register bank 325a comprises eight 60 bit words 1 through 8, 341a-348a, with word 1, 341a, receiving each output 324a-e from 8 to 5 fan-in/out 313a.

Write assembly control 316a sequentially enables each 12 bit byte of word 1, 341a to accept the 12 bit byte from the active processor fan-out 301h. When five 12 bit bytes have been received by word 1, 341a, then one 60 bit ECS 100 word has been assembled. Full-empty control 318a then causes the contents of word 7, 347a, to be transferred to word 8, 348a, word 6, 346a be transferred to word 7, 347a, etc. until word 1, 341a has been transferred to word 2, 342a. When eight 60 bit words (forty 12 bit transmissions from processor 8 fan-out 301h) have been received, then full-empty control 318a halts further transmission of data to buffer 0 register bank 325a from 8 to 5 fan-in/out 313a and signals the active processor ECS I/O channel 201a. At this point ECS function and address control 314a transmits the ECS address from the second and third function words 221 and 222 on function and address line 332a to ECS 100, along with function bit 220b. When ECS 100 is ready it sends an accept signal (on one line of the pairs of lines 418a, b or c) to the transmit data control 315a, b or c involved. The contents of buffer 0 register bank 325a is gated and transmitted to ECS 100 via transmit data control 315a 60 bits at a time according to a predetermined timing schedule on 60 bit line 402a for buffer 0, and line 402b and 402c for buffers 1 and 2, until 8 60 bit words, or 480 bits have been sent to ECS 100. The read/write index register 333a is tested after each 480 bit transmission, and if 0, ECS function and address 314a is signaled to disable all further inputs to 8 to 5 fan-in/out 313a. If not 0, read/write index register 333a is decremented by 1.

Input to processor ECS I/O channel 201a from ECS 100 (data retrieval) is again handled by SAU 102 and approximates the inverse of data recording described in the previous paragraphs. A retrieval operation starts with the transmission of function words 1-3, 220, 221, and 222 to SAU 102. A retrieve operation occurs when function field 220b is 0. The three function words enter SAU 102 through the appropriate processor fan-out 301a-h and again are transferred to ECS function and address subsystem 314a in buffer 0, 300a, or the corresponding subsystem in buffer 1, 300b, or buffer 2, 300c. Processor and buffer select control 330 again enables a buffer 300a. ECS function and address subsystem 314a transmits the 24 bit ECS address plus the function via address line 332a to ECS 100. ECS read control subsystem 317a receives the accept signal 418a sent by ECS 100 in response to the ECS address and function and causes word 1, 341a, of buffer 0 register bank 325a to accept 60 bit data words from ECS 100 on line 401a. As each word is received, the words in buffer 0 register bank 325a are shifted upward under control of full-/empty control subsystem 318a as in the write operation, until eight 60 bit words have been accepted. Disassembly control 319a then sequentially gates 12 bit bytes from word 8 of buffer zero register bank 325a, to 5 to 8 fan-in and fan-out subsystem (5 to 8 fan-in/out) 324a, starting with bits 11-0. Each of data lines 330a-330e has 12 individual bit lines allowing the transfer of each 12 bit byte from word 8, to 5 to 8 fan-in/out 324a to proceed in parallel. One of the eight 12 bit data lines 320a—320h leads into each processor 1-8 fan-ins 302a-302h. This selection is controlled by processor and buffer select control 330 (FIG. 3b) which energizes that one of the eight control lines 328a-328h corresponding to whichever processor I-8 fan-out 334a-334h received the function words. Whichever control line 328a-328h is energized causes its corresponding processor fan-in 302a-302h to enable one of its three 12 bit input data lines 320a-322a through 320h-322h, respectively, from 5 to 8 fan-in/out 324a, or the corresponding 5 to 8 data fan-in/out in buffer 1, 300b or buffer 2, 300c. Processor 1-8 fan-ins 302a-302h perform the necessary line driving and time and level shifting to present the data to data link 216b attached to the ECS I/O channel 201a in the appropriate processor 121-128. After five 12 bit transmissions from word 8, 348a, have occurred, the contents of word 7, 347a, is shifted into word 8, and similar shifts are made in word 6, word 5, etc. until all the contents of words 1-7 have been shifted to the next higher numbered word. This process continues under control of full/empty control 318a until the original contents of word 1, 341a, has reached word 8, 348a, and has been disassembled and sent to the processor 1-8 fan-ins 302a-302h.

After each ECS operation, the final result is signaled to the processor involved in a status word. The status word is sent to the processor by execution of an extra input instruction by the processor involved. One choice of status word contains three separate fields as shown in status word 225, FIG. 2b. Field 225a specifies whether the data transfer was actually performed by ECS 100. If it was, the accept signal sent by it to SAU 102 is stored as a 1 in abort/accept bit 225a. If not, an abort signal received by SAU 102 causes the abort/accept field 225a to be set to 0. Parity field 225b specifies, as it is respectively 0 or 1, whether the transfer was without or with parity error. Field 225c need not concern us here.

Buffer 1, 300b and buffer 2, 300c are identical to buffer 0, 300a. Selection of buffer 0, 1, or 2, 300a-c, as indicated earlier, is performed by processor and buffer select control 330. These buffers are designed for simultaneous operation, so as many as three processors can be concurrently transferring data to or from SAU 102. Since transfer is much slower between the processors 121-128 and SAU than between SAU 102 and ECS 100, the effect is almost as though three processors at a time communicate with ECS 100, even though only one buffer at a time can communicate with ECS 100.

Figure 4:
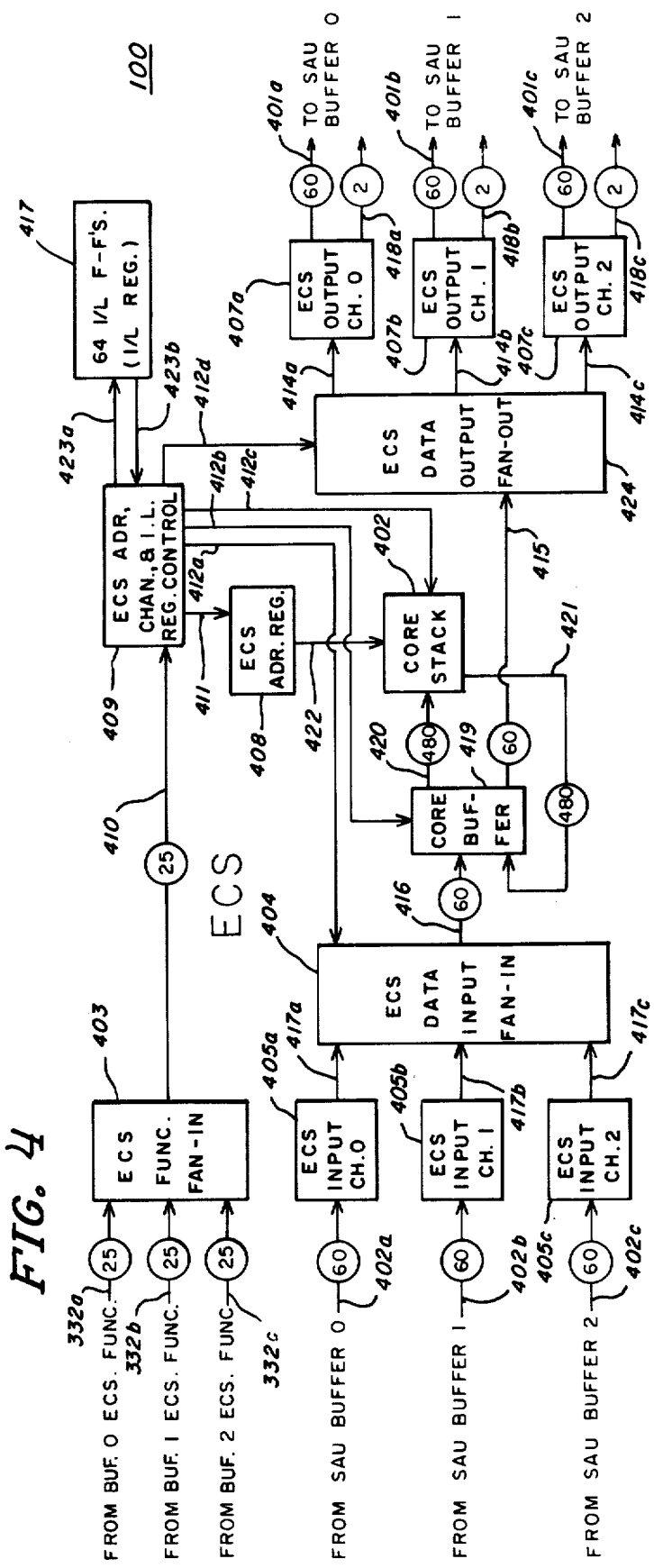
FIG. 4 is a block diagram of the extended core storage.

Turning next to FIG. 4, therein is shown ECS 100 in block diagram form. Commands to ECS 100 are received from the 3 ECS function and address subsystems 314a, b and c within the SAU buffers 302a, b and c on the 3 input lines 332a, b and c respectively. ECS function fan-in 403 sequentially scans input lines 332a, b and c and whenever a command is found, stops the scan to process it. Thus, only one function at a time may occur within ECS 100, others being forced to wait. The command is transmitted via line 410 to ECS address, channel, and interlock register control (ECS control) 409, where the address portion is extracted and placed in the ECS address register (ECS AR) 408 via lines 411. ECS control 409 supplies gating and triggering signals to various other blocks comprising ECS 100, as shown by control lines 412a, b, c and d.

Considering first the data record operation, assume a command such as described earlier in connection with the operation of SAU 102 is received by ECS function fan-in 403 on link 332a from buffer 0, 302a. As will be recalled, each command comprises a 24 bit address, and a one bit function code which when 1, indicates recording. The address is transferred to ECS address register 408 by ECS control 409. After receiving the function code, ECS control 409 signals buffer 302a that data transfer can begin by setting the accept signal on one of the 2 signal lines 418a. Responsive to the accept signal, SAU buffer 0, 302a, presents eight 60 bit words to ECS channel 0 input 405a on link 402a. These words are transmitted to ECS data input fan-in 404, which, responsive to a control signal from ECS control 409, enables the data from ECS input channel 0, 405a and data link 417a to 480 bit core buffer 419. Integral with core buffer 419 is a fan-in which in response to signals from ECS control 409 gates each 60 bit word in a predetermined sequence to, e.g. first the highest 60 bits in core buffer 419, and then to successively lower order 60 bit words. When 8 60 bit words have been received by core buffer 419, ECS control 409 strobes core stack 402 causing the 480 bits to be stored in core stack 402 at the address contained in ECS address register 408.

To retrieve data the ECS address is placed in ECS address register 408 as before. The line recorded in the specified address is read out of core stack 402 and placed in core buffer 419. More or less concurrently with this, an accept signal is sent as before to SAU buffer 0, 302a, which is then used by SAU buffer 0 to condition its input link to receive data from ECS output channel 0, 407a. After the accept signal has been sent, the contents of core buffer 419 is sent, 60 bits at a time on link 415 to ECS output fan-out 424. The 60 bit words are taken from core buffer 419 in the same order they were assembled for recording at an earlier time. The gating of the successive words to ECS output fan-out 424 is done by a fan-in, not shown, forming part of core buffer 419. As ECS output fan-out 424 receives each 60 bit word, it supplies it via link 414a, 414b or 414c to the proper ECS output channel, in this case channel 0, 407a, which in turn alters the signals to make them compatible with the SAU buffer input and transmits them to SAU buffer 0, 302a, via 60 bit output link 401a.

At the end of each record or retrieve operation, ECS control 409 sends a second signal to the SAU buffer 300a, b or c involved which indicates whether the transfer occurred with or without a detectable parity error. This information is then used along with the accept or abort signal to complete the information contained in status word 225, as described earlier.

Besides recording data, ECS 100 also maintains a bank of 64 interlock flip-flops 417. Depending on the function word received by ECS function fan-in 403, these interlock flip-flops can be individually set, cleared, read, and tested. Table I shows a selected repertoire of interlock register instructions.

TABLE I

INTERLOCK REGISTER FUNCTION CODES

| Code (Octal) | Operation | Description |
|---|---|---|
| 2 | Clear | The interlock bit specified by the interlock bit address in the command is cleared unconditionally. |
| 4 | Set | The interlock bit specified by the interlock bit address is unconditionally set. |
| 10 | Test | The interlock bit specified by the interlock bit address in the ECS command is tested and if set, the ACCEPT is set, if the interlock bit is not set, the ABORT is set. |
| 12 | Test Clear | The interlock bit specified by the ECS instruction is tested and if set the ACCEPT is set. If the bit is not set, the ABORT is set. In either case, the specified bit is cleared. |
| 14 | Test Set | The bit specified by the interlock register address in the ECS instruction is tested and if set the ACCEPT is set. If the bit is not set, the ABORT is set. In either case, the specified bit is set. |
| 1 | Read | The upper 32 bits of the interlock register are sent to ECS fan-out 424 if bit 0 of the interlock bit address field (bit 3 of word 3, 224) is set. If bit 0 of interlock bit address is 0, the lower 32 bits of the interlock register is sent to ECS output fan-out 424. The 32 bits received by ECS output fan-out 424 are transmitted as an ordinary data word on the output channel corresponding to the input channel receiving the ECS function word. |

TABLE I-continued

INTERLOCK REGISTER FUNCTION CODES

| Code (Octal) | Operation | Description |
|---|---|---|
| | | ing to the input channel receiving the ECS function word. |

Note*
The code comprises bits 0-2 of word 2, 223 as the high order bits, and bit 11 of word 3, 224 as the low order bit and is shown in FIG. 2b as field 223c. The interlock bit address comprises bits 3 through 8 of word 3, 224, in FIG. 2b, field 224b, with the lowest order interlock bit having address 0, and the address of each increasing by 1 for each successive bit to the left. The left-most bit has an address of $63_{10}$ ($77_8$).

Words 2 and 3, 223 and 224, form the 24 bits of the ECS address word during interlock operations. Since no ECS address is as large as $60000000_8$, interlock operations can be easily determined. Function field 220b must be 0, indicating data retrieval, during an interlock operation. An interlock register operation starts with the processor transmitting the usual 3 word command code to SAU 102, but incorporating the above-described format. SAU 102 then transmits the 25 bit ECS function code to ECS 100. ECS 100 then processes the flip-flop in interlock register 417 specified by field 224b in word 3, 224. If one of the test commands (function codes $10_8$, $12_8$, and $14_8$) was given, it is then necessary for the processor involved to do a one word input from SAU 102, to read the status word 225. It then must test the abort/accept bit 225a which will be a 1 if the accept was set and a 0 if the abort was set. When reading (function code 1), a 3 word input must be done.

While a processor 121-128 references interlock flip-flops 417, all other processors are automatically prevented from referencing the interock flip-flops until the reference is completed, because ECS 100 can execute only a single command at a time. The condition of selected interlock flip-flops provides a means for a processor to signal all the other processors simultaneously and continuously that a particular condition exists. Thus, if a particular table in ECS 100 which is used commonly by several processors is to be altered by a first processor, by testing and setting (interlock function code 14) a preselected interlock flip-flop all other processors can be signaled that the table is in the process of being changed. If the bit has been previously set by a second processor, the first finds the accept bit set in the status word read from SAU 102. Appropriate action then can be taken by the first processor to delay reference to the table until the second has cleared the interlock bit. This most often simply means continually testing and setting the interlock bit until it is eventually cleared by the processor which originally set it.

The preceding described the basic hardware comprising this invention. However, to use effectively a data system such as this one, it is necessary that overall control of the system be performed under computer control. Several reasons for this exist. In many types of processing, each individual computing job or task may be only a few seconds or even tenths of a second long, measured in actual processor computing time needed, but hundreds of the jobs may be involved. Secondly, various processors may be delayed by I/O references for periods of time sufficiently long that strictly computing tasks can be done in the interim. As pointed out earlier, the various processors may have different computational capabilities and I/O configurations, and in such situations a large number of tasks, all having internally specified processing requirements, can be more easily allocated to the various processors by computer control. There are several ways this may be mechanized. The usual fashion is to have one processor designed as "master," which performs task assignment for all the other processors, either by altering the hardware to permit direct electronic control, or by providing flags within the common memory, in the instant system, ECS 100. The means actually chosen in this system is more diffuse, wherein each processor 121-128 performs a part of this task assignment function for itself interactively with the other processors 121-128.

Communication between ECS 100 and each individual processor is handled by a resident program executable in any processor. This resident program may be completely stored within resident area 200a (FIG. 2) of each processor, or preferrable, to conserve as much memory as possible for task performance, a permanent portion may be stored within area 200a, and temporary portions of the resident program stored in ECS 100. Although the resident routine may be designed to perform many different functions, to understand the operation of this system, its functions can be limited to reading and writing of ECS 100, including interlock register operations. A resident routine is selected by storing appropriate parameters at a predetermined memory location and performing a return jump or branch to entrance address 200c. The return jump stores the address of the instruction following the return jump at a predetermined location, to be used to re-enter the task upon completion of the resident function.

The executive routine (Exec) comprises the major set of system programs available to all processors at any time and performs the actual task assignment and management. Exec governs activation of tasks and interaction between them. The activation of a task by Exec is always in response to the demand of another task. That is, during execution of a task, its programmed-in logic can activate or "call" a second task. This call may result from user-supplied input from a peripheral device 103a, b, etc. received by a task, from completion of processing certain specified data by a task, or from the need by a task for a particular computation.

It is important to realize that a copy of each task is permanently available to the system either in ECS 100 or in a mass memory type peripheral device 103a, etc. A task, once activated, is the basic software unit of the computing system. A single task may be activated many times within such a short time span that all will be in some stage of completion simultaneously. A task forced to wait after activation for some reason will always be reactivated and in almost all cases will eventually be completed. Upon reactivation, however, it need not be returned to the original processor 121-128 in which the earlier execution occurred. It may be executed by any processor 121-128 having the capability to execute the task. Thus, depending purely on the unpredictable sequences of system activities a task may at one time or another while active, be executed by any or all of the processors 121-128 in the system. Similarly, the same task upon another activation may be completely executed within a single one of the processors 121-128 which, coincidentally, was available for processing each time the task was reactivated.

Figure 5:
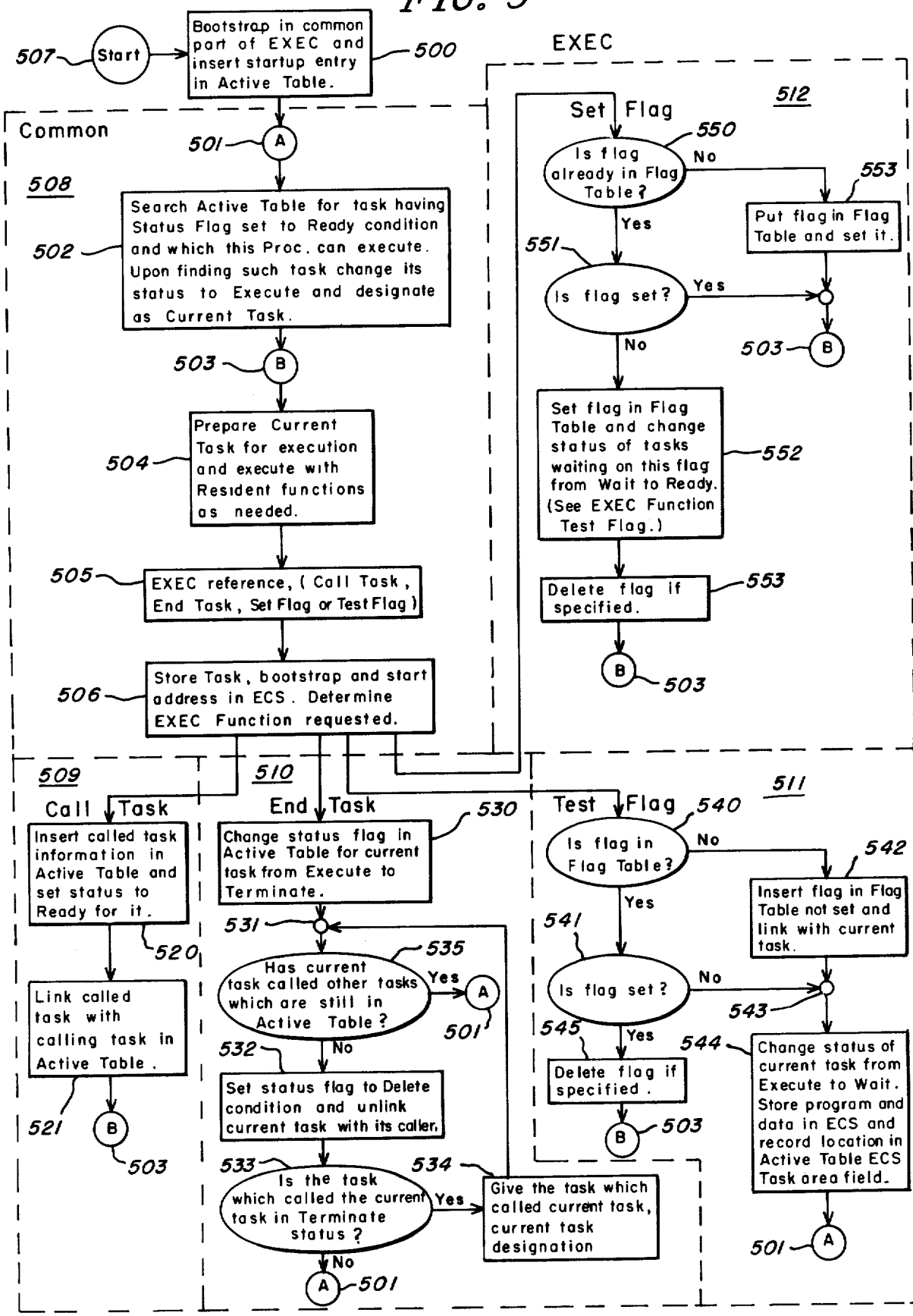
FIG. 5 is a flow chart of the operations of the processors in performing the preferred management of the entire system.

In order to explain more clearly the technique by which task management is done, FIG. 5 is provided. FIG. 5 is a conventional program flow chart wherein rectangular operation boxes denote processing and computation, ovals denote decision-making operations, and circles denote connectors. It should be understood that the structure and interrelationship of activities in this flow chart are intended to emphasize what is felt to be novel. Thus, a given rectangular operation box may include decision operations which do form part of the processing involved, but are not felt to be novel. For example, operation box 502 includes as a portion of its operation a search of the Active table for a task. Several decisions are implicit in this operation: each individual Active table entry must be tested to see whether the associated task is executable. If all entries in the Active table have been searched and no executable task found, then the Active table must be re-searched until finally an executable task is found. Since table search operations are well known no great detail is given for this activity. The statement within each decision-making oval is in the form of a yes-no question. Two flow lines emerge from each decision oval, one labeled "yes", the other labeled "no." The appropriate flow line is taken depending on the answer to the question in the oval. Connector circles designate a common entrance location from either decision ovals or operation boxes. If lettered, processing flow returns to the connector having the same letter within and which precedes an operation box or decision oval.

It should be kept in mind that the flow diagram of FIG. 5 displays only the essential operations necessary for operation of the task assignment system. Addition of other capabilities which may increase the efficiency and convenience of the system are optional. Some of these options will be briefly discussed during the explanation of FIG. 5 which follows:

The task assignment system of FIG. 5 has three important tables associated with it which comprise the aforementioned task list, the Task Description table, the Active table and the Flag table. For simplicity these will be treated as simple, unordered lists of entries maintained in ECS 100. It is more preferable to form these tables as threaded lists, which decreases the overall storage requirements for the tables and increases the speed of access to the individual entries in the list. These tables may also be ordered in a convenient fashion to increase search speed in the table involved.

The Task Description table completely specifies the information associated with the permanent copy of each task. The information contained by each Task Description table entry includes the location and size of the task in ECS 100, an identifier, processor characteristics required, and possibly information specifying the data required by it. Each time a task is called, or selected for execution, the information in the Task Description item associated with a particular task provides Exec with the information necessary to activate that task.

Each task may conveniently given a standard format wherein a block or "bootstrap" having a completely standardized format comprises the first part of each task and is loaded in a preselected area of a processor memory operating area 200b to initiate execution of the task. Execution of the instructions in the block will cause the remaining instructions of the task to be loaded and may load necessary data tables as well.

The two remaining tables store the information necessary for the management of active tasks. These latter two tables are all maintained under interlock in ECS 100, and may be accessed by only one processor 121-128 at a time. The necessity for this restriction will become apparent during the description of the Exec routines. The Active table contains an entry for each activation or instance of a task. (There is some ambiguity in referring to both the permanent copy of a task maintained in ECS 100 and each instance of a task which exists only until execution of it is completed, as a task. In general, in the context of the Active table and the execution of a task within a processor 121-128, "task" means an instance of a task. The ECS 100 permanent copy and associated Task Description table context refers to the nonexecuting permanent copy of each task maintained in the system from which every task instance is activated.) There are no restrictions on the number of times which a task may be activated nor, subject to interlock conditions, when a task may be activated. Therefore, several identical copies of a particular task may be concurrently active, and indeed even executing simultaneously within the several processors 121-128. Each entry in the Active table pertains to one particular instance of a task and contains the fields listed in Table II.

TABLE II

A. Caller Link, which identifies the task which called the task having this entry.

B. Called Task List, which identifies all task instances activated by the task instance having this entry. This field may index to a block of data containing the identifications.

C. Status Flag — a five-valued flag which indicates current status of the task instance as either Ready, Execute, Wait, Terminate, or Delete. "Delete" means the Active table entry involved is available for holding data for another task activation.

D. Task Description Table Entry Pointer, which identifies the entry in the Task Description table from which this task came.

E. Processor Characteristics, which specifies which of the processors can execute the task. This information is extracted from the Task Description table, using, possibly, a system description table as well.

F. ECS Task Area, the address of the ECS 100 block which holds the bootstrap for loading the program and data for the task. The bootstrap is loaded in a standard location as explained before, and by executing it all necessary data and coding are automatically loaded.

G. Processor Save Area, which specifies the memory areas of the processor whose contents must be saved if execution is interrupted by a Test Flag operation.

H. Starting Address, which specifies the starting address at start of execution of a task, if not standard, or after execution has been interrupted by a Test Flag operation.

It should be kept in mind that various fields in the Active table and other tables may be indices, or indices to indices to the actual information. Such indirect addressing is commonplace in the art, and no further notice will be taken of instances where it can be advantageously used.

The third table comprising the task list is the Flag table. The Flag table stores the condition of each flag, set or not set, and identifies the task or tasks which are in Wait status pending setting of the flag by storing their Active table entry indices in a task field of the flag's Flag table entry. The Flag table will be more thoroughly explained in conjunction with the Set Flag and Test Flag commands.

With this understanding of the contents of the tables used in the management of tasks, FIG. 5 can now be explained. Starting at the start connector 507, the first processing which must be done is to set up the common portion of Exec in each processor 121-128 to permit processing to start. This set-up can be done in many different ways. For example, MCU 121 may have a permanently wired dead start routine which will load a short program automatically from some external source, such as a peripheral device 103a, or from manual console insertions. At any rate, a bootstrap routine must be loaded into each processor 121-128 and instruction execution commenced by each. The bootstrap routine then causes the instructions corresponding to Common routine 508 to be loaded in each corresponding processor 121-128. An initial start-up entry must be placed in the Active table. This may be done by an arbitrarily selected one of the processors 121-128. The start-up routine then can load all of the required routines and place them in ECS 100, where they will be available to processors 121-128.

It should be understood that the Common routine 508 which each processor 121-128 executes may differ from every other Common routine 508 wherever individual differences in the various processors 121-128 dictate. The most drastic difference, of course, is that between MCU 121 and the standard processors 122-128, where MCU 121 has responsibility for monitoring performance of processors 122-128 and initiating re-start in the case of certain faults. Even the standard processors 2 to 8, 122-128, may differ slightly in their common routines. Common routine 508 is shown in broad enough detail to be applicable for any of the processors 2 to 8, 122-128.

Common routine 508 may be entered at one of two places. The first entrance is connector A, 501. Execution at connector A commences immediately after system startup, and when a new task must be activated. Start of execution at connector A causes the operations of box 502 to be performed. Operation box 502 contains what is called the "idle loop." In the idle loop, the Active table is continuously searched for a task which has Ready status and which is of the type that the processor searching the Active table can execute. If none is found during a search of the Active table, the Active table is searched again and again until such a task is located. (When several passes are required before a "find" is made, a task eventually located was inserted in the Active table at some time while the search was going on, by other tasks executing in other processors.) At this point, it should be observed that the Active table can never be completely empty of tasks. A basic or primary task must always be present whose function is to communicate, or at least control the communication, with users of the system through the various peripheral devices 103a. Thus, this primary task must always be executing in one processor 121-128 if all the other processors 2 to 8, 122-128 are in their idle loops. This condition implies that all processing requested has been completed. The primary task is the major exception to the rule that every task must have an End Task command, and that every task is eventually completed.

It should again be pointed out that only one processor at a time is allowed to examine the Active table. The reason is that if more than one are simultaneously searching the Active table, both may select the identical task for execution and trouble is certain to follow. Access to the Active table is conditioned upon an interlock bit which is examined by each processor 1-8, 121-128, with a Test Set (operation code 14₈) interlock register instruction. If the interlock register bit is set, the ACCEPT is set. This condition in abort/accept bit 225a of the returned status word 225 causes the program to re-execute the Test Set instruction and continue doing so until an ABORT response is received. At this point, that one of the processors 1-8, 121-128, which had been searching the Active table has completed its search, and indicated this fact by performing a clear (instruction code 2) interlock register instruction. In this manner, no opportunity exists for a particular task with Ready status to be executed by more than one processor. While a particular task may have more than one instance in the Active table, a single instance of a task should, of course, be executing at a given instant in only one processor. It should be understood that certain updating of the Active table can be done concurrently, i.e. without interlock, with the search of the Active table. E.g. task status may be changed from Execute to Terminate, or a new task may be inserted in the Active table pursuant to a Call Task command, q.v.

Upon finding a task in the Active table meeting the stated conditions, the Active table status flag for that task must be altered to Execute status. After changing the status flag, then the Active table interlock bit can be cleared, releasing the Active table for use by the Common routines 508 in the other processors 1-8, 121-128.

The last step in operation box 502 is to designate the selected task as the "current task." By this term is meant the task whose Active table entry is referenced whenever Active table references associated with the currently executing task, or thereafter until another task is designated as "current," are required. In general, the task found as a result of searching the Active table is designated as the "current task" for that processor. This designation can be performed most simply be setting a preselected local memory address to the index to the selected task. When discussing the End Task operation, other tasks may be designated as the "current task" in the processor involved. This merely means that another entry in the Active table is referenced.

Following operation box 502, connector B 503 provides the second entrance to Common routine 508 whenever an Exec operation has been performed which does not require changing the current task from execute status. Operation box 504 specifies preparations necessary to initiate execution of a task. Many different methods to accomplish this preparation are possible. The means which I prefer involves loading a pre-set bootstrap comprising 2 ECS lines (80 processor words) from the ECS 100 location specified by the ECS task area field in the Active table entry for the current task. This bootstrap was pre-set at the time the task was entered into the Task Description table to load the task from ECS 100 into processor memory area 200b. If task processing is interrupted by a wait, the entire task including the bootstrap is stored in ECS 100, in a location different from that specified by the Task Description table item, of course. Before the task is stored in this case, the bootstrap is modified so that when execution of the task is again scheduled, the bootstrap can be read in and the task and data read in by it from the correct storage locations in ECS 100. In both initial startup and after a wait, after the task is completely loaded, the bootstrap causes a jump to the proper instruction in the task. The address of this instruction is stored in the Starting Address field of the task Active Table entry and may be made available to the bootstrap in any of several ways. At this point, task execution commences and continues uninterrupted until an Exec reference specified by operation box 505 occurs. Upon the occurence of an Exec (or even a Resident if resident memory area 200c is too small) reference, the Processor Save Area as specified in the Active table with the entry for the current task is stored in ECS 100 as previously described, with the bootstrap routine for reloading the processor upon reactivation of the task. Then Common routine 508 determines the Exec function requested and transfers control to one of the four Exec function routines, Call Task 509, End Task 510, Test Flag 511, or Set Flag 512.

Turning first to the Call Task operation 509, as may be inferred its purpose is to enable the execution of one of the tasks having an entry in the Task Description table. A Call Task operation does not cause the immediate execution of the called task. It effects the insertion of an entry of the task in the Active table with Ready status. In due course, execution of the task will occur. The reference to the called task is most conveniently accomplished by insertion of an index to the Task Description table entry in the current task during assembly or compiling. It may also be done by matching an identifier placed in the current task. The Task Description table stored in ECS 100 contains the information which is inserted in the Active table entry for the called task by operation box 520 and the called task entry is assigned a location in the Active table. The status field in this entry is set to Ready. Operation box 521 cross-references the calling (current) and called tasks by inserting the Active table entry index for the current task in the caller link field of the called task Active table entry and the corresponding Active table entry index of the called task in the called task list for the current task Active table entry. Upon completion of these manipulations, the Call Task routine 509 continues execution of the current program at connector B 503.

Execution of a task continues until it is suspended in one of two ways. A task may be terminated by the End Task operation, which causes transfer to End Task routine 510 of Exec. (The second way to suspend execution of a task involves the Set Flag and Test Flag commands, and will be discussed infra.) Operation box 530 is almost self-explanatory, and deals merely with changing the status flag field in the Active table entry for the current task from Execute to Terminate. Then decision oval 535 specifies the examination of the called task list for the current task Active table entry to determine whether the current task has called other tasks which have not been deleted from the Active Table. If the current task has done so then it cannot be deleted from the Active Table until these tasks have themselves terminated in which case return is to Connector A 501. But if it has not called such tasks, then it can be deleted from the Active table, as shown in operation box 532. To delete the task, the status flag is set to the Delete condition and the current task is unlinked from the task which called it (caller) by removing the current task's Active table index from the caller's called task list in the Active table. As may be recalled, the index to the caller's Active table entry is stored in the caller link field of the current task's Active table entry.

Next, the test shown in decision box 533 determines whether the task which originally called the just deleted current task is in Terminate status. If so, then it is necessary to re-examine the caller task to determine whether it may be deleted from the Active table now that the current task has been deleted. This is done by giving the task which called the current task, current task designation, which is mechanized within the program by merely changing the current task Active table index to that specifying the caller's entry. End Task routine 510 is then re-executed starting at connector 531, tests and operations identical to those described for the "old" current task being performed on the "new" current task. This operation continues for "new" current tasks successively higher in the caller chain until finally a task is reached which does not have Terminate status. At this point, Common routine 508 is re-entered at connector 501 to begin a search for another task.

When several interrelated tasks which form a complete processing system are being executed, often one task cannot complete its operation until another task has reached a certain point in its execution. It is inefficient to idle a processor until the second task has reached the required stage of execution. Therefore, the Set Flag and Test Flag commands are provided for purposes of communication between the individual tasks. When a task reaches a certain stage in its execution, the programmer may indicate this fact to other active tasks by performing a Set Flag command. Associated with each Set Flag command is a named flag or flags, each of which is defined by the programmers who are writing the tasks involved with the flag, and may be assigned an internal designation in several ways, by the compiler or assembler being used to construct the routine. When a Set Flag command is encountered in execution, Set Flag routine 512 is entered by Exec. Assume first that only a single flag is specified by the Set Flag command. Within Set Flag routine 512, decision oval 550 symbolizes a search of the Flag table to determine whether the flag has been previously inserted in it. If it has not, this means that the current task has reached a point in its execution and presumably created necessary data for other tasks before they needed it. The flag is inserted in the Flag table in the Set condition by the operations in box 553, so that when other tasks later on test this flag, they will find that it is set and will continue with their processing. After entering and setting the flag, execution of the current task can continue.

If the flag is already entered in the Flag table, then the additional question posed in decision oval 551 must be settled. If the flag is in Set condition this merely means that another task has set the flag prior to the current task. In this case also, current task execution restarts where it left off before the execution of the Set Flag function. If, however, the flag is not set, then it must be set in the Flag table. As further described in operation box 552, the fact tht the flag was in the Flag table but not set implies that the flag had been previously tested and either was not found in the Flag table or was found in the Flag table in the Not Set condition. The result of this was to cause each testing task to be changed in status from Execute to Wait. At that time the Flag table was linked to these tasks now in Wait status by placing their Active table entry index in the task field of the Flag table entry for the flag. The Active table entry for each of these tasks having Wait status must be entered and their status changed from Wait to Ready so that their execution can eventually resume. At this point, if the Set Flag command has so specified, the flag may be deleted as shown in operation box 553. After the operations of operation box 552 have been done, the Common routine 508 is re-entered at connector 503 for further execution of the current task.

The Test Flag routine 511 is intimately related to Set Flag routine 512. This is the second way in which task operations may be suspended. Whereas the End Task command permanently concludes the particular call of the task involved, the Test Flag command only temporarily suspends execution of the task, pending later setting of the flag by the above-mentioned Set Flag command. Each Test Flag reference has a flag designator associated with it in the original coding, which specifies the flag to be tested in a fashion similar to that of the Set Flag operation. In Test Flag routine 511, the first operation, symbolized by decision box 540, is a search of the Flag table to determine whether the flag specified by the Test Flag operation is in the Flag table. If it is, then the flag is examined to determined whether it is set or not, as described in decision box 541. If the flag is set, then execution of the current task can continue. Before returning to the current task, the flag must be deleted if the Test Flag reference included such a command. This can be easily done at operation box 545 by merely setting the flag identifier to some predetermined value which specifies a blank Flag table item. Then the common routine 508 is entered at connector 503. If, however, the first decision, whether the flag is in the Flag table, is answered in the negative, then the flag is inserted in the Flag table not set and the Active table entry index of the current task is placed in the task field of the Flag table entry for the flag in operation box 542. After this has been done or, if the flag was originally in the Flag table in a not set condition, as shown by entering connector 543 from decision oval 541, then the current task is changed from Execute to Wait status, as shown in operation box 544. As a part of this status change, the portions of processor memory operating area 200b necessary to permit later execution of the current task are stored in ECS 100. This area or areas is specified by the processor save area field of the current task Active table entry. The ECS task area field for the current task Active table entry and associated bootstrap must also be updated to permit execution of the task to continue when the flag is finally set. Since further execution of the current task is not immediately allowable, common routine 508 is entered at connector 501 so that the processor involved may find a new task for execution.

Optional means for eliminating a flag may be used. It may be deleted after it has been tested a certain number of times. Another method is to place a time limit on the flag which causes its deletion at the expiration of the specified time. The Set Flag operation may also have options to either clear or to delete without setting, a selected flag.

If the option to allow one Test Flag command to specify two or more flags is present, by convention it is understood that a single Set condition in a specified flag is sufficient to allow processing of the current task to continue. Decision ovals 540 and 541 must be modified to test all the specified flags. If none is set, then the pertinent operations in boxes 542 and 544 may be performed.

There are obviously, several system maintenance routines which are necessary for efficient use of the system. First, of course, ultimately the system must receive direction from its human users. This takes the form of input to the optional peripheral devices 103a, b, etc. and may be, for example, Hollerith cards, typewriter, or paper tape. An input handling routine must be present whose execution can be done only by the processors to which the peripheral devices 103a, b, etc. are connected. The commands contained in this input cause activation of various tasks for reading in input data and processing it. E.g., if a program assembly is required, an input card deck might include a control card specifying the assembly program, which then would cause the activation of the assembly control task. This task would then activate other tasks as needed to read in a card deck containing the coding, perform the assembly, format an output program magnetic tape, produce a printout of the assembled program, and execute the assembled program. Such routines are, of course, well known.

Secondly, in any normal operating system, the programs available to users will be in continual change. Thus, additions and deletions to the Task Description table are frequently desirable. A second task or group of tasks may be assigned to maintain the Task Description table. Since, however, the Task Description table is extremely important in maintaining the integrity and efficiency of the system, special provisions should be made to allow only certain authorized programs to alter sensitive portions of the Task Description table. This may be in the form of a special set of characters which direct the Resident to permit alterations of the Task Description table and the tasks themselves. Since I/O and ECS 100 operations are controlled by software operations, it is simple to build memory protection for ECS 100 into the Resident. Thus the Task Description table can be effectively maintained.

Having thus described my invention, what I claim as patentable is:

1. Apparatus for processing a plurality of discrete computing tasks, each expressed as a sequence of digital computer instructions, at least one task including a call instruction requesting the performance of a task specified by the call instruction, and at least one task including a task suspension instruction, comprising:
    (A) an addressable main memory recording digit sequences contained in a record signal responsive thereto at the address specified by an address signal, and supplying in a data signal the digit sequence recorded at the address specified by the address signal responsive to a retrieve signal, and storing within predetermined areas a plurality of tasks and a task description table specifying the information necessary for activation and execution of each task;
    (B) a storage access unit having a plurality of associated pairs of input and output channels, and supplying record, retrieve and address signals to the main memory responsive to record and retrieve-specifying function codes accompanied by data and an address signal on any one of the plurality of input channels; and supplying retrieved data sequences on the output channel associated with the input channel receiving the function code specifying the retrieve function; and
    (C) a plurality of local processors whose elements can store and retrieve data in the main memory via a preselected input and output channel pair of the storage access unit, each processor comprising:
        (1) an addressable local memory accessible to all other elements of the local processor and including a current task cell;
        (2) task activation means receiving a call task signal identifying a task for forming responsive thereto an active table entry specifying the location of the identified task in main memory and containing a multi-state status flag indicating a ready state, and for issuing signals to the storage access unit causing the active table entry to be stored in an unused area of an active table in the main memory, each said area identified by an associated index;
        (3) task selection means for issuing signals to the storage access unit to cause at least one active table entry to be retrieved from the main memory responsive to an idle signal, for examining the status flag in each active table entry retrieved, and for, responsive to the ready state of the status flag in any retrieved active table entry, setting the current task cell to the index of the active table entry having such a status flag, and thereafter issuing signals to the storage access unit for
            (a) changing the status flag in the active table entry in the main memory indexed by the contents of the current task cell to an execute state and, next,
            (b) retrieving the task whose location is specified by the active table entry indexed by the contents of the current task cell and storing it in the local memory; and
        (4) task execution means for
            (a) executing each task indexed by the current task cell responsive to its storage in local memory,
            (b) supplying the idle signal to the task selection means responsive to detection of a task suspension instruction, and
            (c) supplying the call task signal to the task activation means responsive to detection of a call instruction.

2. The apparatus of claim 1 adapted for processing at least one task wherein the task suspension instruction comprises an end instruction in a predetermined sequence specifying the end of task execution, wherein the active table entry status flag for the task can assume delete and terminate states and each active table entry includes a called task field, wherein at least one task execution means further comprises means for supplying an end task signal responsive to detection of an end instruction; and wherein at least one task activation means further comprises means for including within the active table entry created responsive to each call task signal a calling task field containing the contents of the current task cell and means for supplying signals to the storage access unit causing the identity of the called task to be inserted in the called task field of the active table entry specified by the current task cell; and further comprising task termination means for, responsive to the end task signal:
    (i) supplying signals to the storage access unit causing the status flag in the active table entry indexed by the current task cell to be set to the terminate state;
    (ii) issuing a delete signal;
    (iii) responsive to each delete signal, examining the status flag of each active table entry indexed by the called task field of the active table entry indexed by the current task cell, and if the status flag of each such active table entry is in terminate state changing the status flag of the active table entry indexed by the current task cell to the delete state, and removing the index stored in the current task cell from the called task field of the active table entry specified by the calling task field; and (iv) examining the status flag in the active table entry indexed by the calling task field of the active table entry specified by the current task cell, and if in terminate state, inserting the calling task field of the active table entry indexed by the current task cell, in the current task cell, and issuing a delete signal.

3. The apparatus of claim 1 adapted for processing at least one task having in a predetermined sequence a set flag instruction including a digit sequence specifying a flag:

wherein the main memory further comprises a storage area recording a flag table having an entry available for assigning to each flag and having a condition field having set and unset states and a waiting task field for recording at least one active table index; and wherein the task execution means in at least one preselected processor further comprises:
(a) means for detecting a set flag instruction and responsive thereto, inspecting the flag table for an entry matching the specified flag, and for issuing a primary flag present signal upon detecting such match; and
(b) flag setting means receiving the primary flag present signal and responsive thereto if the condition field of the flag table entry matching the flag specified by the set flag instruction is unset, issuing signals to the storage access unit causing this condition field to be changed to the set condition and the status flag in at least one active table entry indexed by the waiting task field of this flag table entry, to be set to its ready state.

4. The apparatus of claim 3 wherein one active table entry further comprises a starting address field recording a local memory address; and wherein at least one of the task execution means further comprises means for causing execution of the loaded task to commence at the address recorded in the starting address field.

5. The apparatus of claim 3, wherein the set flag instruction detecting means further comprises means for issuing a primary flag absent signal responsive to failure to detect a match of the specified flag during flag table inspection, and flag inserting means receiving the primary flag absent signal for, responsive thereto, establishing a flag table entry matching the flag specified by the set flag instruction and having its condition field in the set state.

6. The apparatus of claim 3 adapted for processing at least one task having in a predetermined sequence a test flag instruction including a digit sequence specifying a flag:

wherein each active table entry assigned to a task containing a test flag instruction has a status flag capable of assuming a wait state, a temporary storage address field for recording a main memory address, and a starting address field for recording a local memory address;

wherein the task execution means in each preselected processor further comprises means for detecting a test flag instruction and responsive thereto supplying a test flag signal, means for halting execution of instructions and issuing an idle signal responsive to a flag unset signal, and means for starting execution of each retrieved task at the address specified in the starting address field of the active table entry indexed by the contents of the current task cell; and wherein each preselected processor further comprises:

(A) flag table lookup means for issuing a secondary flag present signal responsive to a flag table entry matching the flag specified by the test flag instruction, and a secondary flag absent signal otherwise;
(B) flag testing means receiving the secondary flag present and absent signals for, responsive to the secondary flag absent signal, issuing signals to the storage access unit establishing a flag table entry in the flag table assigned to the flag specified by the test flag instruction and having its condition flag in the unset state and its waiting task field containing the contents of the current task cell, and issuing a flag unset signal to the task execution means of the processor involved; and responsive to the secondary flag present signal, testing the condition flag in the flag table entry specified by the test flag instruction and if unset,
(i) issuing a flag unset signal to the task execution means of the processor involved, and
(ii) issuing signals to the storage access unit
(a) causing the area of the local memory holding the current task to be recorded in a temporary task storage area of main memory and
(b) within the active table entry indexed by the current task cell, causing the address of the temporary task storage area in main memory to be recorded in the temporary storage address field, the status flag to be changed to its wait state and the address of the instruction following the test flag instruction to be recorded in the starting address field, and lastly, issuing an idle signal to the task selection means of the processor involved.

7. The apparatus of claim 1 wherein the task activation means further comprises means for including in each active table entry a digit sequence specifying at least one processor which can execute the task, and wherein the task selection means further comprises means for determining whether the processor of which it forms a part is, according to the active table entry, specified as able to execute the task, and if not excluding the task from selection.

8. The apparatus of claim 1 further comprising an interlock flip-flop having set and cleared states and wherein each task execution means further comprises means responsive to suspension of task execution for examining the interlock flip-flop and if set, waiting until it is cleared, and if cleared, setting it, and issuing the idle signal, and wherein the task selection means further comprises means for clearing the interlock flip-flop after setting a status flag to execute state.

9. The apparatus of claim 8 including means for allowing only one task execution means at a time to examine the interlock flip-flop.

* * * * *